(12) United States Patent
Boekhoorn et al.

(10) Patent No.: US 8,534,081 B2
(45) Date of Patent: Sep. 17, 2013

(54) DEVICE AND METHOD FOR COOLING DRINKS

(75) Inventors: Marcel Martinus Jacobus Johannes Boekhoorn, Bennekom (NL); Maarten Arns, Wijchen (NL); Harry Schippers, Wierden (NL)

(73) Assignee: TOECA International Company B.V., Breda (NL)

( * ) Notice: Subject to any disclaimer, the term of this patent is extended or adjusted under 35 U.S.C. 154(b) by 612 days.

(21) Appl. No.: 12/526,459

(22) PCT Filed: Feb. 6, 2008

(86) PCT No.: PCT/NL2008/050068
§ 371 (c)(1),
(2), (4) Date: Sep. 14, 2010

(87) PCT Pub. No.: WO2008/097088
PCT Pub. Date: Aug. 14, 2008

(65) Prior Publication Data
US 2011/0000229 A1 Jan. 6, 2011

(30) Foreign Application Priority Data

Feb. 7, 2007 (NL) ..................................... 2000477
Jul. 13, 2007 (NL) ..................................... 2000750

(51) Int. Cl.
*F25B 41/00* (2006.01)

(52) U.S. Cl.
USPC ............................................. 62/122; 62/340

(58) Field of Classification Search
USPC ............... 62/122, 48.1, 457.1, 340, 342, 343, 62/344, 345; 426/524, 519, 565; 99/455, 99/459
See application file for complete search history.

(56) References Cited

U.S. PATENT DOCUMENTS 3,068,105 A 12/1962 Morrison
3,340,825 A * 9/1967 Bombardieri ................ 261/69.1
(Continued)

FOREIGN PATENT DOCUMENTS

EP 1690481 A2 8/2006
GB 1147396 4/1969
(Continued)

OTHER PUBLICATIONS

International Preliminary Report on Patentability; International Patent Application No. PCT/NL2008/050068; Jun. 17, 2009.
(Continued)

*Primary Examiner* — Mohammad M Ali
(74) *Attorney, Agent, or Firm* — Jason A. Bernstein; Barnes & Thornburg LLP

(57) ABSTRACT

Device for cooling drinks with a drink supply container (30a, 30b) for a water-comprising drink, a cooling medium supply container (22) for holding at least one cooling medium, —dosing means adapted to dose a quantity of drink and a quantity of cooling medium required for cooling the dosed quantity of drink, a mixing chamber (36) for successively collecting a quantity of drink and a quantity of cooling medium respectively dosed by the dosing means, and—at least one stirring element (39), which stirring element is positioned relative to the mixing chamber (36) such that the stirring (39) element is adapted to generate a vortex in the drink present in the mixing chamber, wherein the stirring element (39) is also adapted to mix together drink present in the mixing chamber (36) and cooling medium present in the mixing chamber (36), wherein the cooling medium in the mixing chamber (36) undergoes a phase change to the gaseous state and/or an adiabatic expansion while cooling the drink.

38 Claims, 8 Drawing Sheets

(56) References Cited

U.S. PATENT DOCUMENTS

| | | | | |
|---|---|---|---|---|
| 3,958,428 A | * | 5/1976 | Kelso | 62/69 |
| 4,793,151 A | * | 12/1988 | Masel et al. | 62/306 |
| 5,410,888 A | * | 5/1995 | Kaiser et al. | 62/136 |
| 5,758,571 A | * | 6/1998 | Kateman et al. | 99/455 |
| 6,534,106 B2 | * | 3/2003 | Cathenaut et al. | 426/317 |
| 6,698,228 B2 | * | 3/2004 | Kateman et al. | 62/346 |
| 7,754,266 B2 | * | 7/2010 | Waletzko et al. | 426/524 |
| 7,781,006 B2 | * | 8/2010 | Brisson et al. | 426/565 |
| 2006/0110515 A1 | * | 5/2006 | Waletzko et al. | 426/565 |

FOREIGN PATENT DOCUMENTS

| | | |
|---|---|---|
| GB | 2408467 A | 6/2005 |
| GB | 2425165 A | 10/2006 |
| WO | 03030663 A1 | 4/2003 |

OTHER PUBLICATIONS

International Search Report; International Patent Application No. PCT/NL2008/050068; Oct. 2, 2008.

* cited by examiner

DEVICE AND METHOD FOR COOLING DRINKS

PRIORITY CLAIM OR CROSS REFERENCE TO RELATED APPLICATIONS

This patent application is a U.S. National Phase of International Patent Application No. PCT/NL2008/050068, filed Feb. 6, 2008, which claims priority to Netherlands Patent Application No. 2000477, filed Feb. 7, 2007, and Netherlands Patent Application No. 2000750, filed Jul. 13, 2007, the disclosures of which are incorporated herein by reference in their entirety.

FIELD

The present disclosure relates to a device for cooling drinks, in particular milkshakes, comprising at least one drink supply container for a water-comprising drink and at least one cooling medium supply container for holding at least one cooling medium. The present disclosure also relates to a vending machine provided with at least one such device. The present disclosure further relates to a method for cooling drinks by making use of a device according to the present disclosure.

BACKGROUND

Machine preparation of milkshakes generally takes place by arranging a water-comprising basic substance in a freezing cylinder. A fraction of the basic substance positioned close to the wall of the freezing cylinder will partially freeze. The actual cooled milkshake can be obtained by scraping the frozen fraction from the wall of the freezing cylinder, grinding the frozen fraction and, subsequently, mixing the frozen fraction with the unfrozen fraction of the basic substance. The milkshake will generally also be aerated to provide the milkshake with a lighter character. Although this method is applied industrially on a large-scale in the market, this method for preparing and, in particular, cooling milkshakes has a number of drawbacks. A significant drawback of the known method is that a relatively large number of moving components, such as a scraper and breaking means for crushing the frozen fraction, are required to enable preparation of the milkshake. This makes the preparation method relatively time-consuming. Furthermore, the equipment required to apply the known preparation method, provided with the scraper and the breaking means, is relatively complex and requires relatively frequent maintenance and is, therefore, relatively expensive.

British Patent Application No. 2 408 467 discloses a fluid carbonating system comprising a carbonator tank for containing fluid and means to inject gas into fluid in the tank to create a swirling motion of the fluid within the tank, wherein the gas may be formed by $CO_2$ gas under. However, tests have shown that the injection of a cryogenic cooling medium into the drink does not result in a satisfactory method of preparation either, since ice formation will generally occur in and around a nozzle of the then applied injection means, whereby further feed of the cryogenic cooling medium is no longer possible.

SUMMARY

The present disclosure describes several exemplary embodiments of the present invention.

One aspect of the present disclosure provides a device for cooling drinks, comprising a) at least one drink supply container for a water-comprising drink; and b) at least one cooling medium supply container for holding at least one cooling medium; c) dosing device coupled to the drink supply container and the cooling medium supply container and adapted to dose a quantity of drink and a quantity of cooling medium required for cooling the dosed quantity of drink, d) at least one mixing chamber for successively collecting a quantity of drink and a quantity of cooling medium respectively dosed by the dosing device, and e) at least one stirring element positioned relative to the mixing chamber such that the stirring element generates a vortex in the drink present in the mixing chamber for the purpose of receiving a quantity of cooling medium fed to the mixing chamber, wherein the stirring element is also adapted to mix together drink present in the mixing chamber and cooling medium present in the mixing chamber, wherein the cooling medium in the mixing chamber undergoes at least one of a phase change to the gaseous state or an adiabatic expansion while cooling the drink.

Another aspect of the present disclosure provides a vending machine, comprising a) apparatus for providing drinks responsive to a user input signal b) at least one device for cooling drinks, comprising i) at least one drink supply container for a water-comprising drink; and ii) at least one cooling medium supply container for holding at least one cooling medium; iii) dosing device coupled to the drink supply container and the cooling medium supply container and adapted to dose a quantity of drink and a quantity of cooling medium required for cooling the dosed quantity of drink, iv) at least one mixing chamber for successively collecting a quantity of drink and a quantity of cooling medium respectively dosed by the dosing device, and v) at least one stirring element positioned relative to the mixing chamber such that the stirring element generates a vortex in the drink present in the mixing chamber for the purpose of receiving a quantity of cooling medium fed to the mixing chamber, wherein the stirring element is also adapted to mix together drink present in the mixing chamber and cooling medium present in the mixing chamber, wherein the cooling medium in the mixing chamber undergoes at least one of a phase change to the gaseous state or an adiabatic expansion while cooling the drink.

A further aspect of the present disclosure provides a method for cooling drinks, comprising a) feeding a dosed quantity of drink for cooling to a mixing chamber; b) feeding the drink into the mixing chamber such that a vortex is formed in the drink; c) feeding a dosed quantity of cooling medium into the mixing chamber such that the cooling medium is enclosed by the vortex; and d) mixing the drink with at least a part of the fed quantity of cooling medium, wherein the cooling medium either undergoes a phase change to the gaseous state or undergoes an adiabatic expansion while cooling the drink.

Yet another aspect of the present disclosure provides a relatively simple device for cooling milkshakes or other drinks.

An effective cooling of the drink can be realized by physically mixing a relatively cold, consumable cooling medium with the relatively warm drink. It is moreover possible, because a cryogenic cooling medium is applied which is adapted to cool the drink by undergoing a phase change to the gaseous state and/or by undergoing an adiabatic expansion, to achieve an instantaneous and substantial cooling of the drink, wherein formation of crystals in the drink will, or at least can, occur. This formation of crystals, generally formed only by an ice fraction forming part of the drink, contributes to a taste sensation during consumption of the partially frozen drink. In the case where the cooling medium is adapted to undergo a phase change from a non-gaseous state to a gaseous state, the boiling point of the cooling medium will generally be lower than the freezing point of the drink. For purposes of the present disclosure, the term freezing point means a freezing range. For purposes of the present disclosure, the term boiling point means a boiling range. The heat required to heat and evaporate or sublimate the cooling medium will be extracted from the drink for cooling. Because the initial liquid or solid cooling medium will evaporate or sublimate, small gas bubbles will occur in the drink, whereby the drink will be aerated. Depending on the nature of the drink and, in particular, the viscosity of the drink, the gas bubbles will remain enclosed in the drink in relatively stable and sustained manner or be able to escape relatively quickly and easily from the drink. It is also possible to envisage cooling the drink by allowing adiabatic expansion of a compressed gaseous cooling medium, for instance, air, in the drink. Owing to this increase in volume, the temperature of the cooling medium, and thereby the drink, will decrease, thereby cooling the drink. Cooling and aerating of the drink using the device according to the present disclosure generally also contributes to an enhanced taste sensation during consumption of the drink. During the known preparation of milkshakes, the milkshakes are generally also aerated to enable the taste sensation thereof to be improved, wherein the aeration can take place passively (by whisking air into the milkshake) and/or actively (by injecting air into the milkshake). Another significant advantage of the device according to the present disclosure is that the device is adapted to enable effective and controlled feed of the cooling medium. Because a cryogenic cooling medium, preferably liquid nitrogen, is generally applied, feed of the cooling medium to the drink must take place in relatively critical manner. This is because, if an excess of cooling medium were to be fed to the drink, the drink would then instantaneously freeze, and this is undesirable. If the cooling medium were to make contact with a wall of the mixing chamber, local freezing of the drink to the wall would then occur, which can very adversely affect the further cooling process. As mentioned hereinabove, tests have shown that the injection of a cryogenic cooling medium into the drink does not result in a satisfactory method of preparation either, since ice formation will generally occur in and around a nozzle of the then applied injection means, whereby further feed of the cryogenic cooling medium is no longer possible. The device according to the present disclosure generates a vortex in the drink prior to feed of the cooling medium. This vortex, in fact, functions as a concave receiving space for the fed cooling medium, wherein the cooling medium will generally be fed while falling to the space enclosed by the vortex. Owing to the rotation of the vortex maintained by the stirring element, the cooling medium will be displaced under the influence of centrifugal forces in radial (eccentric) direction over the drink surface formed by the vortex and will be gradually and (generally) partially absorbed into the drink while cooling and aerating the drink. The magnitude of the centrifugal forces is determined by, among other factors, the turbulence of the vortex, wherein the degree of turbulence can be regulated, for instance, by modifying the stirring speed of the stirring element and/or by adjusting the position of the stirring element relative to the mixing chamber. An optimal turbulence must preferably be aimed for here at which there is an optimal mixing on the one hand and prevention of contact between the cooling medium and the mixing chamber and/or the stirring element on the other. Although the stirring element will generally be arranged rotatably in the device, it is also possible to envisage the mixing chamber being disposed rotatably in the device. A combination of the two can also be envisaged. What is relevant is a relative rotation of the stirring element and the mixing chamber. Because the device according to the present disclosure, other than the stirring element (and/or the mixing chamber), does not have to be provided with moving components, the device can take a structurally relatively simple and inexpensive form. It is moreover anticipated that the relatively passive device can hereby function in relatively energy-saving and low-noise manner. In addition to milkshakes, other drinks can also be cooled effectively using the device according to the present disclosure. Examples of other types of drink are alcoholic mixed drinks; iced drinks, in particular, slush puppies; fruit drinks, in particular, smoothies; soft drinks; yoghurt; quark cheese; soups and water. It is, however, also possible to cool soft ice-cream using the device according to the present disclosure, since soft ice cream is a viscous fluid and therefore suitable to be displaced, in particular, pumped, by transport means, such as, for instance, a pump. Soft ice-cream is, therefore, also deemed to be a drink in the context of this disclosure. It is also possible to envisage cooling other types of drink using the device according to the present disclosure, as long as the at least partially liquid drink can be mechanically transported and, in particular, pumped.

In one exemplary embodiment, the stirring element is positioned relative to the mixing chamber such that the stirring element is adapted to generate a substantially elliptic paraboloid vortex in the drink present in the mixing chamber. In an ideal situation, the vortex is preferably a true elliptic paraboloid (parabolic body of revolution). The symmetrical concave space then enclosed by the vortex is particularly advantageous in enabling controlled feed of the cooling medium, whereby contact between the cooling medium and a wall of the mixing chamber, and therefore instantaneous freezing of the drink, can be prevented as far as possible. The design of this symmetrical and, in practice, substantially symmetrical vortex depends on a number of factors including the stirring speed of the stirring element, the design of the stirring element, the design of the mixing chamber, the orientation of the stirring element relative to the drink, the material properties, such as viscosity, of the drink and the orientation of the stirring element relative to the mixing chamber. In respect of this latter factor, it is advantageous if a longitudinal axis of the stirring element is oriented substantially parallel to a generally substantially vertically oriented longitudinal axis of the mixing chamber, whereby the stirring element is, in fact, generally positioned upright in the drink. The longitudinal axis of the stirring element more preferably substantially coincides with the longitudinal axis of the mixing chamber, whereby a vortex of substantially symmetrical cross-section can be formed in the mixing chamber, wherein asymmetrical deformation of the vortex through the agency of a wall of the mixing chamber can be prevented. It is, however, advantageous here if the mixing chamber is given a substantially circular cross-sectional form, whereby the swirls in the drink are caused mainly by the stirring element and not, or at least hardly so, by a wall of the mixing chamber, which will enhance generating and sustaining of a more or less ideal vortex. The diameter of the mixing chamber can be constant, but can also change in the length direction of the mixing chamber. In another exemplary embodiment, the design of the mixing chamber substantially corresponds to a truncated cone, wherein the mixing chamber is more preferably formed by a drinking cup or other type of drink container. The use of a drinking cup as mixing chamber has the advantage that the cooling of the drink, in fact, takes place only in the drinking cup and not beforehand. Stirring of the drink will here also take place in the drinking cup. In this way, it will always be possible to provide a consumer with a freshly cooled drink. The drinking cup will generally be adapted for once-only use and, therefore, will take a disposable form. It is, however, also possible to envisage that the mixing chamber is not formed by a drinking cup, but that the content of the mixing chamber, i.e., the cooled drink, is transferred after preparation to, for instance, a drinking cup, jug, bottle, drink package or other type of drink container suitable for consumers.

The relative orientation of the stirring element and the mixing chamber can preferably be changed, whereby the shape of the vortex to be generated can be regulated in relatively simple manner, and, in particular, is preferably kept substantially constant. The shape of the vortex, and particularly the dimensioning of the vortex, can be influenced by having the stirring element stir more deeply or less deeply in the drink. Modifying the shape of the vortex during cooling of the drink can, however, be particularly advantageous. Because the drink is, in the first instance, relatively warm and not very viscous, it is usually advantageous to position the stirring element in a relatively high position in the mixing chamber, whereby the size of the vortex will remain manageably small and splashing of the drink out of the mixing chamber can be prevented as far as possible. Ice crystal formation will occur in the drink during and after feeding of the cooling medium, wherein the drink will generally also be aerated, as a result of which the drink becomes substantially more viscous. In order to be able to bring about sufficient mixing of the cooling medium, the drink and the ice crystals formed therein and gas bubbles present therein, it is usually advantageous to displace the stirring element to a lower position in the mixing chamber, whereby a more intensive mixing will take place. As a result of the higher viscosity of the drink, the shape of the vortex does not necessarily have to change during and after the displacement of the stirring element relative to the mixing chamber, and splashing of the drink out of the mixing chamber can be constantly prevented. It will be apparent that the shape of the vortex could also be influenced by modifying the stirring speed of the stirring element. The displaceability of the stirring element relative to the mixing chamber moreover enables relatively simple removal of the stirring element from the mixing chamber, this being particularly advantageous in the case the mixing chamber is formed by a drinking cup, whereby the drinking cup can be removed relatively simply from the device. The stirring element and the mixing chamber are more preferably displaceable in an axial direction relative to each other. An axial displaceability will generally be the most advantageous in enabling a relatively efficient regulation and optimizing of the shape of the vortex on the one hand and removal of the stirring element from the mixing chamber on the other.

The device preferably comprises holding means for holding in position and/or being able to displace the mixing chamber. The holding means can be of diverse nature and can, for instance, be adapted to support the mixing chamber. The holding means are preferably adapted for releasable clamping of the mixing chamber, wherein the holding means more preferably comprises at least two clamping elements, in particular, clamping fingers, adapted to engage on either side of the mixing chamber. In yet another exemplary embodiment, the holding means are adapted to displace the mixing chamber in the device, and particularly to displace the mixing chamber relative to the stirring element. In this way the holding means can displace the mixing chamber from an operational position, in which the mixing chamber is adapted to receive drink and cooling medium fed respectively by the dosing means, and a non-operational position, in which the mixing chamber can be taken out of the device to enable consumption of the cooled drink.

In another exemplary embodiment, the device comprises a mixing chamber holder for receiving at least a part of the mixing chamber. The mixing chamber holder is preferably at least partially thermally insulated so as to prevent warming of the cooled drink in the device as much as possible. The mixing chamber holder preferably fits closely onto the mixing chamber and can be adapted to support the mixing chamber. The mixing chamber holder is preferably displaceable relative to the mixing chamber so that, after the cooled drink has been prepared, the mixing chamber can be displaced relatively easily in the device and can optionally be delivered by the device. In one exemplary embodiment, the stirring element, the mixing chamber and the mixing chamber holder are displaceable mutually in line, wherein the mixing chamber is preferably held in position by the holding means. In the case where the mixing chamber is formed by a drinking cup, the drinking cup will then generally be accommodated in practice by the drinking cup holder, after which the stirring element will be arranged in the drinking cup. Successively dosed quantities of drink and cooling medium are then added to the drinking cup. After preparation of the cooled drink, the drinking cup holder, and thereby the drinking cup, will be displaced in a downward direction away from the stirring element to an intermediate position in which an upper edge of the drinking cup is situated just lower than the stirring element. In this intermediate position, the holding means will engage around and hold the drinking cup in position, and the drinking cup holder will be displaced further in a downward direction to a lowermost position in which an upper edge of the drinking cup holder is situated just below a lower edge of the drinking cup. The holding means will then displace the drinking cup in a generally linear movement to a dispensing opening, wherein the linear movement is generally transversely of the previous direction of displacement of the drinking cup holder. In this exemplary embodiment, the drinking cup holder will remain located directly under the stirring element and is, in this way, adapted to collect drink residues dripping from the stirring element. In order to enable removal of the drink residues collected in the drinking cup holder, it is usually advantageous when the drinking cup holder is provided with at least one discharge. If the stirring element were to be flushed clean after preparation of a cooled drink, the cleaning agent, generally water, can also be collected by and discharged via the drinking cup holder. During cleaning of the stirring element, it is usually advantageous that the drinking cup holder is displaced in an upward direction until the stirring element is positioned at least partially in the drinking cup holder in order to be able to limit splashing of drink residues and cleaning agent adjacently of the drinking cup holder, and thereby fouling of the device. It is particularly advantageous when the drinking cup holder is sealed substantially medium-tightly during cleaning of the stirring element, for instance, by applying a top element adapted to fit onto the drinking cup holder. During cleaning of the stirring element, it is generally advantageous to rotate the stirring element, whereby drink residues and cleaning agent will be removed relatively easily from the stirring elements. The drinking cup holder will otherwise be at least partially filled with the cleaning agent during the cleaning in order to also enable cleaning of the drinking cup holder and the stirring element. Removal of the used cleaning agent will generally take place via the discharge forming part of the drinking cup holder and will preferably take place in a forced manner through suctioning of the cleaning agent out of the drinking cup holder via the discharge.

The stirring element can be of very diverse design, although the ideal design and dimensioning for the purpose of being able to generate a more or less ideal vortex will usually greatly depend on, among other factors, the design and dimensioning of the drinking cup. A stirring element of the rod stirrer type is preferably applied, this stirring element being provided with an elongate physical rotation shaft to which one or more stirring blades are connected which project on at least one side relative to the rotation shaft, wherein the stirring blades can also be embodied in diverse ways. In one exemplary embodiment, the stirring element is formed by an anchor stirrer. For purposes of the present disclosure, an anchor stirrer is a particular type of rod stirrer, wherein two respective anchor parts are attached on opposite sides of the rotation shaft. The anchor parts can additionally be connected to each other by one or more transverse connections, whereby a mirror-symmetrical frame will be created. Tests have shown that this type of anchor stirrer or, in particular, frame-type stirrer, is particularly suitable in enabling generation of a stable vortex in the drink present in the mixing chamber, particularly when the mixing chamber is formed by a drinking cup.

In another exemplary embodiment, the dosing means are adapted to feed the cooling medium to the mixing chamber at a position lying between a longitudinal axis of the mixing chamber and a wall of the mixing chamber, wherein feeding of the cooling medium as well as the drink generally takes place by allowing the cooling medium as well as the drink to fall into the mixing chamber. Injection of the cooling medium into the drink will generally result in direct and instantaneous freezing of the applied injection means, whereby further cooling of the drink is not possible. If the temperature of the cooling medium were to lie around the freezing point of the drink, it would then be possible to envisage injection of the cooling medium. However, if liquid nitrogen or dry ice is applied as a cooling medium, injection will not form a workable option for enabling satisfactory and controlled cooling of the drink. By feeding the cooling medium at a position between the rotation shaft of the stirring element and a wall of the mixing chamber, contact between the cooling medium and both the stirring element and the mixing chamber can be prevented as far as possible, whereby the forming of lumps of ice in the mixing chamber at the position of the stirring element and/or at the position of the mixing chamber can likewise be prevented as far as possible. In yet another exemplary embodiment, the dosing means are adapted to feed the cooling medium to the mixing chamber at a position located between 10% and 80%, preferably between 20% and 70%, more preferably between 25% and 60%, of the shortest distance between the longitudinal axis of the mixing chamber and the wall of the mixing chamber as calculated from the longitudinal axis of the mixing chamber. The shortest distance is more preferably calculated from the drink level at the position of the stirring element.

In another exemplary embodiment, the device comprises a plurality of cooling medium supply containers which are mutually connected in series. The use of the plurality of serially connected cooling medium supply containers is usually advantageous from a practical viewpoint. A relatively voluminous, heavy first (main) supply container can be formed by, for instance, a gas bottle, which first (main) supply container can be coupled to a relatively compact second (subsidiary) supply container. Since the first (main) supply container generally takes a relatively voluminous (for instance, 40 liters) and heavy form, the first main supply container is preferably positioned at the bottom of the device. The second (subsidiary) supply container functions as a buffer vessel with a limited volume, generally of a few liters, and can therefore be placed relatively simply higher in the device. The buffer vessel is adapted for connection to the dosing means for feeding cooling medium to the mixing chamber. The buffer vessel is generally connected in series to a first cooling medium supply container for the purpose of supplying the buffer vessel. The buffer vessel is preferably provided with a float to enable the connection between the buffer vessel and the first cooling medium supply container to be broken when the cooling medium in the buffer vessel reaches a determined level. In this manner, the hydrostatic pressure in the buffer vessel can be held substantially constant, this being particularly advantageous in enabling dosage of the cooling medium. Instead of closing the buffer vessel subject to the cooling medium level using a float, this can also be realized in other manner. The cooling medium level will have to be detected and, subject thereto, a closing valve will have to be controlled pneumatically, hydraulically or electromechanically, for example. The buffer vessel preferably takes a double-walled form, wherein a vacuum, or at least an underpressure, is applied in the double-walled jacket to enable efficient insulation of the buffer vessel.

By intentionally keeping the cooling medium in generally liquid or solid state by storing the cooling medium in a conditioned manner in the cooling medium supply container, a phase change of the cooling medium can be brought about in relatively simple manner in the mixing chamber (where an atmospheric pressure generally prevails), whereby cooling of the drink can be realized. Keeping the cryogenic cooling medium under pressure in the liquid or solid state is generally also advantageous for the purpose of enabling storage of relatively large quantities of cooling medium at a relatively low temperature. The cooling medium supply container functioning as a pressure vessel is preferably adapted to keep a liquid cooling medium, more preferably nitrogen, at an increased pressure of, for instance, 1 bar above atmospheric pressure. In addition to nitrogen, it is also possible to envisage applying liquid air, solid carbon dioxide and liquid helium. Other types of cooling media can conceivably also be applied, with the general condition, however, that the cooling medium is suitable for consumption by a consumer. It is also possible to envisage the cooling medium supply container being adapted to hold the cooling medium at atmospheric pressure. This is moreover also particularly advantageous in general from an energy viewpoint. Preferably, however, a liquid or gaseous (and therefore not solid) cooling medium is applied since the liquid and gaseous cooling media can be transported relatively easily. This considerably facilitates the handling of the cooling media and, therefore, the cooling process. It is, however, also possible to envisage the drink being cooled by a first (liquid or gaseous) cooling medium and simultaneously also by a second (solid, liquid or gaseous) cooling medium which can be advantageous from a practical and/or aesthetic viewpoint. In order to hold the cooling medium under pressure, it is usually advantageous to give at least one cooling medium supply container a substantially thermally insulated form. It is advantageous here if the cooling medium supply container comprises a double-walled jacket in which a vacuum, or at least an underpressure, is created. In the case where a plurality of cooling medium supply containers are applied, it is advantageous to give all cooling medium supply containers a thermally insulated form in order to be able to avoid premature heating of the cooling medium as far as possible. The cooling medium supply container preferably connects to the dosing means via an insulated conduit to enable the energy efficiency of the device according to the present disclosure to be optimized. The cooling medium supply container preferably connects directly, so not via a conduit, to the dosing means in order to further increase the efficiency of the device.

The dosing means will generally comprise at least one nozzle connected to the drink supply container and at least one nozzle connected to the cooling medium supply container. The design, dimensioning and positioning of the nozzles can be very diverse here. However, in one exemplary embodiment, the positioning of the nozzles relative to the mixing chamber is such that both the drink and the cooling medium can fall into the mixing chamber under the influence of the force of gravity. Pressure can optionally be applied here to the drink and/or the cooling medium. Allowing the cooling medium to fall into the mixing chamber instead of injecting the cooling medium into the drink present in the mixing chamber has the significant advantage that the forming of lumps of ice in the drink can, in this way, be prevented to a further extent, whereby the drink remains fully stirrable, which will enhance a relatively rapid and effective homogenous cooling of the drink.

In another exemplary embodiment, the device comprises a control unit which is at least adapted to control the dosing means such that a dosed quantity of drink and a dosed quantity of cooling medium can be fed successively to the mixing chamber. The control unit is more preferably also adapted to control the stirring element such that the stirring element is activated before the cooling medium is fed to the drink. An optimum dispersion of the cooling medium in the drink, and therefore an optimal cooling of the drink, can be realized by feeding the cooling medium during stirring of the drink. In the case where the mixing chamber is formed by a drinking cup, a vortex with a concave liquid surface will be created by stirring the drink, in which surface the cooling medium will subsequently be arranged. As stated, a controlled feed of the cooling medium to the drink, a controlled mixing of the drink and the cooling medium, and thereby a controlled cooling and aerating of the drink, can be realized by applying the vortex. The concave liquid surface accelerates the dispersion of the cooling medium through the drink and prevents contact of the cooling medium with a wall of the mixing chamber or drinking cup. The optimal stirring speed or rotation speed of the stirring element depends on multiple factors including the design and dimensioning of the cup holder and the stirring element and the viscosity of the drink. The control unit is preferably also adapted to regulate the stirring speed of the stirring element, and the control unit is also adapted to control the change in the shortest distance between the stirring element and the mixing chamber and, in particular, the relative orientation of the stirring element, the mixing chamber, the mixing chamber holder and the holding means if applied.

In yet another exemplary embodiment, the cooling medium supply container comprises cooling means for actively cooling the cooling medium. In this manner, the cooling medium can prevent warming of the cooling medium in the cooling medium supply container, whereby a sufficiently low temperature of the cooling medium for the purpose of cooling the drink can remain guaranteed. In the case where liquid nitrogen is applied as a cooling medium, it will then not generally be necessary, and usually not technically possible, to apply active cooling means for the purpose of active cooling of the liquid nitrogen. The dosing means are adapted to dose the quantity of drink, the quantity of cooling medium and, optionally, if applied, a quantity of additive to be fed to the mixing chamber. The dosing of the quantity of drink and the quantity of cooling medium respectively can be based on a mass weight of drink and cooling medium to be fed respectively to the mixing chamber and/or a volume of drink and cooling medium to be fed respectively to the mixing chamber. In addition, the dosage can be time-controlled, wherein the dosing means enable respective feed of the drink and cooling medium for a determined period of time. In this time-defined dosage, the respective quantity of drink and quantity of cooling medium to be eventually fed to the mixing chamber will depend on the flow speed (quantity per unit time) of the drink and the cooling medium respectively. The device preferably comprises closable dosing means for dosed supply of the cooling medium to the mixing chamber in order to realize efficient dosing. The dosing means will usually be operated in hydraulic, pneumatic and/or electrical manner. In one exemplary embodiment, the dosing means allow a supply of the cooling medium such that the final temperature of the drink cooled in the mixing chamber is less than or equal to the freezing point of the drink. By re-cooling the drink to a temperature which is just less than or equal to the freezing point of the drink, the formation of a crystal fraction, in particular, an ice fraction, can be realized in the drink which improves the taste sensation during consumption of the drink. It is otherwise noted that the drink will generally be a mixture which will not generally have any specific freezing point, but rather a freezing range. It will be apparent that it is also possible to envisage re-cooling the drink to a temperature just above the freezing point of the drink, whereby ice will not form in the drink.

In another exemplary embodiment, the device comprises dispersing means for dispersed supply of the cooling medium to the mixing chamber in order to enable realization of a predefined and more preferably a substantially homogeneous mixing of the cooling medium with the drink. Supplying the cooling medium to the mixing chamber in dispersed (diffuse) manner can be brought about in various ways, such as, for instance, using a venturi diffusor and/or an atomizing screen. In the case where a solid cooling medium, such as, for instance, dry ice (solid carbon dioxide), is applied as a cooling medium, the dry ice can be fed in a crushed manner to the drink for cooling. It is also possible to feed dry ice tablets to the drink.

The drink supply container is preferably provided with pressure-generating means to enable displacement of the drink under pressure from the drink supply container to the dosing means. The pressure-generating means will generally comprise at least one pump. The pressure-generating means can be of pneumatic, hydraulic and/or mechanical nature, for example. The pressure-generating means can engage directly on the drink. The drink supply container will, however, usually comprise a bag in which the drink is received, wherein the pressure-generating means engage directly on the bag, and thereby indirectly on the drink. The bag will usually be enclosed by a housing, whereby the drink supply container is adapted as a so-called bag-in-box.

In another exemplary embodiment, the cooling medium supply container is provided with pressure-generating means to enable displacement of the cooling medium under pressure from the cooling medium supply container to the dosing means. The pressure-generating means can also comprise at least one pump, although this generally depends on the temperature of the cooling medium to be displaced. In the case where liquid nitrogen is applied as a cooling medium, it will generally not be possible to apply a pump for the purpose of pumping the relatively cold liquid nitrogen. In the case of relatively cold liquid cooling media, including liquid nitrogen, it is usually advantageous to exert a gas pressure on the liquid cooling medium to enable displacement of the cooling medium to the dosing means, and subsequently to the mixing chamber. The gas applied for the purpose of applying sufficient pressure can be of a diverse nature and can, for instance, be formed by atmospheric air. It can, however, also be efficient to apply evaporated cooling medium for the purpose of generating sufficient gas pressure.

In the case where the mixing chamber is not formed by a drinking cup, the mixing chamber preferably has an at least partially, and more preferably substantially, tubular form, wherein the drink can be guided into the mixing chamber via a first supply side of the tubular mixing chamber and can be guided out of the mixing chamber via an opposite second discharge side of the mixing chamber. In the case where the drink present in the tubular mixing chamber were to be deemed, in theory, as an assembly of drink packages, all drink packages will, in an ideal situation, then have the same uniform residence time in the mixing chamber, which is also referred to as a plug flow. Although this ideal situation will not generally be feasible in practice, this situation will, however, usually be aimed for in order to enable the best possible control of the process of cooling the drink. It will generally be necessary to displace all liquid packages at the same speed in the mixing chamber. Instead of a pump, a plunger received with a clamping fit in the mixing chamber can also be applied, in the case of a tubular mixing chamber, for the purpose of transporting the drink through the mixing chamber, wherein the plunger is preferably moved through the mixing chamber at a substantially constant speed. Although a separate mixing chamber will generally be applied, it is also possible to envisage the mixing chamber and the drink supply container being at least partially integrated with each other, or even being formed by one and the same component, wherein the drink supply container is, in fact, also adapted to function as a mixing chamber.

In yet another exemplary embodiment, the device comprises a substantially closed housing in which at least the drink supply container, the cooling medium supply container and optionally the mixing chamber are accommodated. By having the supply containers and the mixing chamber encased by the housing, a substantially constant microclimate can be created around these components in a relatively simple manner. This microclimate will generally be relatively cool, for instance, about 4° C., in order, on the one hand, to enable relatively sustained preservation of the drink and, on the other hand, to enable the physical properties of the drink to be held relatively constant, whereby the method for cooling a drink using the device according to the present disclosure can be controlled relatively well. The housing can be cooled by means of a separate cooling system, although it is generally also possible to cool the housing by evaporation or sublimation of the cooling medium initially received in the cooling medium supply container. The latent heat required for this evaporation or sublimation can be extracted from the microclimate surrounding the cooling medium supply container, whereby the microclimate can be cooled.

It can be advantageous for the device to comprise at least one additive supply container for an additive, this additive supply container being adapted for connection to the dosing means via which the at least one additive can be fed to the mixing chamber. In this way it is possible, in relatively simple manner, to enrich a basic drink with one or more additives. The additives can optionally also be added to the drink after and/or just before cooling of the drink in the mixing chamber. Examples of possible additives are coloring agents, flavorings, aromatic substances, thickeners, preservatives and the like. The at least one additive is preferably supplied to the drink by applying pressure-generating means, as already discussed hereinabove, from the additive supply container.

In the case where the mixing chamber is not formed by a drinking cup, the drink can be removed from the mixing chamber after cooling of the drink in the mixing chamber, for instance, by means of pouring by tilting the mixing chamber. The device, however, preferably comprises dispensing means for dispensing the cooled drink. The dispensing means herein preferably comprise a closable tap. It is also possible for the dispensing means to comprise a dispensing opening which is accessible to a consumer and in which the device, if applied, will place a drinking cup after preparation of the cooled drink in the device. The consumer can then take the drinking cup out of the device from the receiving space.

The present disclosure also relates to a buffer vessel for use in a device according to the present disclosure. The buffer vessel is adapted for temporary storage of the cooling medium. The buffer vessel is generally connected in series with a first cooling medium supply container for the purpose of supplying the buffer vessel. On an outlet side, the buffer vessel, optionally via a conduit, is generally adapted to feed the cooling medium to the mixing chamber. The buffer vessel is preferably provided with a float to enable breaking of the connection between the buffer vessel and the first cooling medium supply container when a determined level of cooling medium is reached in the buffer vessel. In this manner, the hydrostatic pressure in the buffer vessel can be held substantially constant, this being particularly advantageous in enabling dosaging of the cooling medium. The buffer vessel preferably takes a double-walled form wherein a vacuum, or at least an underpressure, is applied in the double-walled jacket to enable efficient insulation of the buffer vessel. The buffer vessel can be sold as a separate component.

In addition, the present disclosure relates to a vending machine or dispensing machine provided with at least one device according to the present disclosure. The dispensing means are preferably provided with a receiving space for receiving at least one drink container (cup). Further exemplary embodiments of the device have already been described hereinabove. The vending machine will generally be of commercial type and be adapted to dispense one or more drinks upon payment. The vending machine can herein be placed, for instance, on company premises or in public areas. The dimensioning and design of the vending machine can be of very diverse nature, wherein the vending machine can, for instance, be embodied as a floor model or as a table model. It is otherwise also possible to envisage the device forming part of a machine adapted for private use. A table model exemplary embodiment will here generally be most appropriate. In the case of a machine to be applied in a private setting, it will not generally be necessary to pay for a drink before the drink is dispensed by the machine.

The present disclosure further relates to a method for cooling drinks, in particular, though not necessarily using a device according to the present disclosure, comprising the steps of: a feeding a dosed quantity of drink for cooling to a mixing chamber; b setting into motion the drink fed to the mixing chamber such that a vortex is formed in the drink; c feeding a dosed quantity of cooling medium to the mixing chamber such that the cooling medium is arranged in a space enclosed by the vortex; and d mixing the drink with at least a part of the fed quantity of cooling medium, wherein the cooling medium undergoes a phase change to the gaseous state and/or undergoes an adiabatic expansion while cooling the drink. Advantages of this method have already been described at length hereinabove. The latent heat required for the phase transition can be extracted from the drink during cooling of the drink. The transition to the gaseous state is usually favorable for cooling the drink from an energy viewpoint, although in this way the drink can also be aerated efficiently in a relatively simple manner, which will usually enhance the taste sensation in the case where a milkshake, soft ice-cream, a slush puppie, a smoothie, and the like are being prepared or at least cooled by applying the method according to the present disclosure. By generating a vortex (also referred to as a whirlpool), the cooling medium can be fed in a controllable manner to the drink and subsequently mixed efficiently with the drink, wherein the risk of the formation of lumps of ice in the mixing chamber is minimized.

In one exemplary embodiment, a substantially elliptic paraboloid vortex is generated during step b. An elliptic paraboloid is a symmetrical parabolic (concave) body of revolution which can be generated by arranging a rotation shaft of a stirring element substantially perpendicularly in a substantially horizontal liquid surface of a drink. The rotation axis of this substantially paraboloid vortex will substantially coincide with the rotation axis of the stirring element. It will otherwise be apparent that a true elliptic paraboloid vortex can only be achieved theoretically, and that in practice the shape of this ideal vortex can only be approximated.

In another exemplary embodiment, a vortex is generated in step b with a depth of between 1 and 6 cm, preferably between 2 and 6 cm, more preferably between 3 and 5 cm. The depth of the vortex can be regulated, among other ways, by changing the stirring speed (rotation speed) of the stirring element. By giving the vortex a height of between 1 and 6 cm, the cooling medium will generally be absorbed in a controlled manner into the vortex. If the height of the vortex were to become less than 1 cm, the volume enclosed by the vortex will then generally become too small to absorb the total cooling medium to be fed to the drink. If the height of the vortex were to become greater than 6 cm, the vortex will then generally rotate in a turbulent manner such that centrifugal forces exerted on the cooling medium present in the vortex become so great that the cooling medium will creep relatively quickly, and generally too quickly, in the direction of a wall of the mixing chamber whereby contact will occur relatively quickly between the cooling medium and the wall of the mixing chamber. This has the consequence that formation of ice lumps will occur relatively quickly at the location of the wall. Particularly in the case where a drinking cup is applied, it is generally advantageous that the height of the vortex lies between 3 and 5 cm. If a relatively shallow vortex is applied, dosage of the cooling medium into the vortex will generally be particularly critical, since the volume enclosed by the vortex is then relatively limited. With a relatively shallow vortex of, for instance, 1 cm, the dosing speed will generally have to be relatively low so as to prevent, as far as possible, contact between the cooling medium on the one hand and the wall of the mixing chamber and/or the stirring element on the other. It is found in practice that a dosing speed of between 0.4 and 15 milliliters of cooling medium per second is generally sufficient to be able to arrive at a controlled feed of the cooling medium. In the case where a standard truncated cone-like drinking cup is applied as a mixing chamber for the purpose of preparing a milkshake with a volume of about 450 ml, about 300 ml of milkshake will then generally be fed to the drinking cup in which a vortex with a height of 4 to 5 cm is generated to which about 40 grams of liquid nitrogen is fed in portions at a dosing speed of about 5 grams per second (about 7 ml per second).

In one exemplary embodiment, the quantity of cooling medium fed to the mixing chamber during step c amounts to between 10% by volume and 70% by volume of the volume enclosed by the vortex. A volume percentage lower than 10% will generally be too low to be able to arrive at a desired cooling and aerating of the drink. At a volume percentage higher than 70% the vortex, is filled such that there is a ready chance of contact between the cooling medium and the stirring element and/or the wall of the mixing chamber. It will be apparent that these percentages are related to the height of the vortex. An optimum balance will, therefore, generally have to be found in practice between an ideal shape and height of the vortex on the one hand and an optimum degree of filling of the vortex on the other.

In order to be able to prevent as far as possible the chance of contact between the cooling medium and the wall of the mixing chamber and/or the stirring element, and thereby the chance of the formation of lumps of ice, it is generally advantageous if during step c the cooling medium is fed to the mixing chamber at a position located between 10% and 80%, preferably between 10% and 50%, of the shortest distance between the longitudinal axis of the mixing chamber and the wall of the mixing chamber as calculated from the longitudinal axis of the mixing chamber, and more preferably from the longitudinal axis of the mixing chamber at the position of a lowermost point of the vortex.

At least one stirring element is preferably applied in order to keep the drink in motion as according to step b and to mix the drink and the cooling medium as according to step d. The stirring element herein preferably comprises a physical rotation shaft and at least one stirring blade connected to the rotation shaft and projecting at least on one side relative to the rotation shaft, wherein the at least one stirring blade protrudes relative to an upper surface of the drink. The design of the stirring element and the relative orientation of the stirring element and the mixing chamber will generally be important in being able to generate the most ideal possible vortex, in particular, a substantially elliptic paraboloid vortex.

In another exemplary embodiment, the stirring speed of the stirring element is higher during step d than during step b. Before and during feeding of the cooling medium the drink will generally be not very viscous and relatively liquid. By keeping the stirring speed relatively low at this stage, a relatively stable vortex can be realized to which the cooling medium can be added in a relatively controllable manner. During feeding of the cooling medium to the drink, the drink will cool and the formation of ice crystals will then generally occur in the drink whereby the drink will generally become substantially more viscous. In order to be able to realize homogenous cooling of the drink, it is advantageous to increase the stirring speed whereby the depth of the vortex will generally increase. Splashing of the drink will, however, not occur, or hardly so, because the drink is then sufficiently viscous. It is also advantageous here when the position of the stirring element relative to the mixing chamber can be changed between a lower position and at least one position higher than the lower position, wherein the stirring element is positioned at a higher position during step b, and wherein the stirring element is displaced to the lower position during step c and/or d. The turbulence of the vortex can also be regulated by regulating the height of the stirring element relative to the mixing chamber, wherein a vortex with little turbulence will, in the first instance, be generated in the drink during step b, and wherein the turbulence of the vortex will be increased during step c and/or c. As already stated, a more intensive mixing will occur in the mixing chamber in the case of a higher degree of turbulence (swirling) of the vortex. This relatively high turbulence can, however, generally only be allowed in the case where the drink has become sufficiently viscous as a consequence of cooling and aerating of the aqueous drink. It is also possible to envisage keeping the stirring speed substantially constant and only changing the position of the stirring element relative to the mixing chamber to allow sufficient manipulation of the shape of the vortex.

The stirring element is preferably removed from the mixing chamber after performing step d, whereby the mixing chamber can be more readily displaced and/or emptied. In yet another exemplary embodiment, the method also comprises step e, comprising displacing the mixing chamber to a dispensing opening for the mixing chamber after performing step d. The dispensing opening will generally be accessible to a consumer for consumption of the freshly cooled drink. The mixing chamber will generally be formed by a drinking cup.

It is possible to envisage the whole dosed quantity of drink being fed at one time to the mixing chamber and the whole dosed quantity of cooling medium being fed at one time to the mixing chamber. It is, however, also possible to envisage step a and step c being repeated at least once after performing step c, whereby the whole quantity of drink and the whole quantity of cooling medium are fed in successive portions (sub-doses) to the mixing chamber in order to successively cool relatively small quantities of drink with relatively small quantities of cooling medium. In this way the drink can usually be cooled in a more controlled manner in the mixing chamber.

In still another exemplary embodiment, a quantity of cooling medium is supplied to the mixing chamber during step c such that the final temperature of the cooled drink is lower than or equal to the freezing point, or freezing range, of the drink. By having the final temperature of the drink be lower than the freezing point of the drink, a crystal fraction, in particular, an ice fraction, will generally be created in the drink which generally enhances the taste sensation.

The cooling medium supplied during step c is preferably mixed substantially homogeneously during step d with the drink displacing in the mixing chamber whereby, on the one hand, a substantially homogeneous cooling of the drink can be realized and whereby, on the other hand, the formation of lumps of ice in the drink can be prevented or at least discouraged.

In another exemplary embodiment, the drink fed to the mixing chamber is set into motion during step b such that contact of the cooling medium fed during step c with a wall of the mixing chamber is in the first instance prevented. The cooling of the wall of the mixing chamber as a result of direct contact between the cooling medium and the wall of the mixing chamber will usually entail a loss in cooling capacity of the cooling medium. It is therefore advantageous to prevent as far as possible direct contact between a cold-producing (cryogenic) cooling medium and the wall of the mixing chamber and to have the relatively cold cooling medium only make direct contact in the first instance with the drink for cooling. After a few moments, the cooling medium will heat up and mix with the drink and possibly still come into contact with the wall of the mixing chamber. At that moment, however, the cooling medium has already been heated to the temperature of the cooled drink whereby the cooling action of the cooling medium is no longer present.

BRIEF DESCRIPTION OF THE DRAWINGS

Various aspects of the present disclosure are described hereinbelow with reference to the accompanying figures. The present disclosure will be elucidated on the basis of non-limitative exemplary embodiments shown in the following figures.

DETAILED DESCRIPTION

Figure 1:
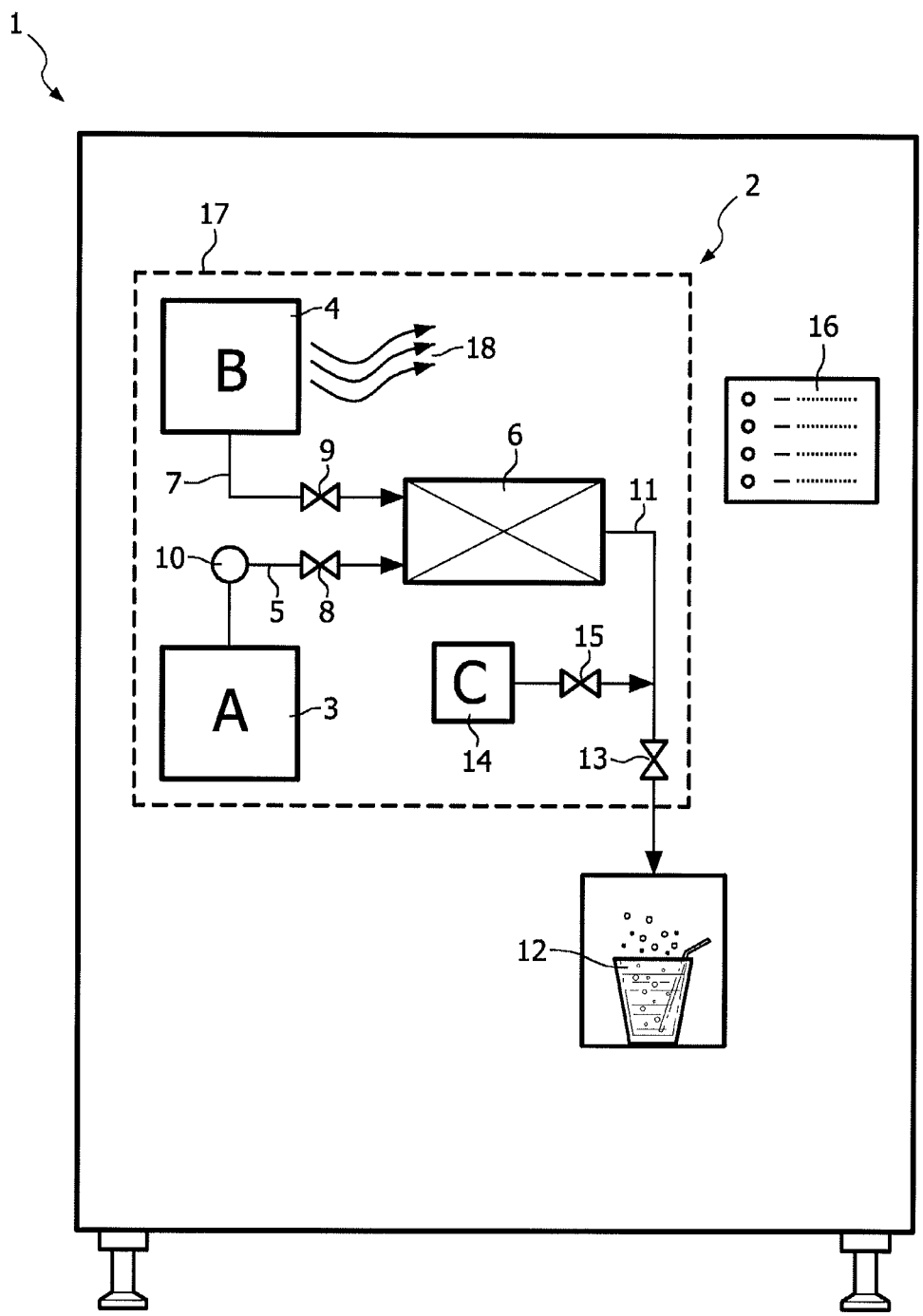
FIG. 1 shows a schematic view of a vending machine provided with a device according to one exemplary embodiment of the present disclosure.

FIG. 1 shows a schematic view of a vending machine 1 provided with a device 2 for cooling drinks. Device 2 comprises a first supply container 3, in which a water-comprising drink (A), in particular, a milkshake mix, is held, and a second supply container 4 in which liquid nitrogen (B) is held under pressure. First supply container 3 is connected by means of a first supply conduit 5 to a mixing chamber 6, while second supply container 4 is connected by means of a second supply conduit 7 to the mixing chamber. Both the first supply conduit 5 and the second supply conduit 7 are provided with a closing valve 8, 9 to enable dosaged supply of respectively drink and liquid nitrogen to mixing chamber 6. Supply of the drink to mixing chamber 6 takes place by means of pumping the drink from first supply container 3 to mixing chamber 6 using a pump 10. Supplying liquid nitrogen to mixing chamber 6 takes place on the basis of gravitation and/or by applying a rise tube and as a result of a gas pressure, in particular, nitrogen pressure, developed in second supply container 4. In this exemplary embodiment, the liquid nitrogen is stored in second supply container 4 at atmospheric pressure. In order to be able to keep the nitrogen liquid until it reaches mixing chamber 6 in a relatively simple manner, both the second supply container 4 and second supply conduit 7 take an insulated form. In mixing chamber 6, the drink and the liquid nitrogen are mixed together whereby the liquid nitrogen will heat up and will evaporate to gaseous wherein heat is extracted from the drink. In this manner, the drink, in particular, the milkshake, can be simultaneously cooled and aerated relatively efficiently. The drink, in particular, the milkshake, will moreover cool during mixing such that an ice fraction will form in the drink which, the more so in combination with simultaneous aerating of the drink, will considerably improve the taste sensation of the drink, in particular, the milkshake. In this exemplary embodiment, the drink to be eventually dispensed is re-cooled to a temperature of about −2° C. During mixing of the drink with the nitrogen, the drink will be transported continuously through mixing chamber 6 using pump 10 in order to be able to prevent freezing of the drink in mixing chamber 6. After passing through the tubular mixing chamber 6, the cooled and aerated drink can be dispensed via a discharge conduit 11 into a cup 12. Discharge conduit 11 can herein be closed using a closing valve 13. A third supply container 14 provided with an additive (C) can optionally be applied in order to enrich the cooled and aerated drink in discharge conduit 11 with the additive. Third supply container 14 is provided with a separate closing valve 15 to enable optional addition of the additive to the drink. Via a control panel 16 forming part of vending machine 1, a user can enter diverse wishes in respect of the drink to be dispensed by the vending machine 1. The device can then be controlled accordingly via a control unit (not shown). In order to be able to hold substantially constant the temperature of the drink not yet supplied to mixing chamber 6, device 2 comprises a substantially closed housing 17 in which all supply containers 3, 4, 14, as well as mixing chamber 6 are accommodated. Through inevitable nitrogen leakages 18 from second supply container 4, the housing 17 can be kept at a relatively low temperature (about 4° C.), which enhances preserving of the drink and facilitates control of the cooling in mixing chamber 6. Housing 17 can optionally also be actively cooled by separate cooling means. The shown device 2 is structurally very simple in that no moving components are applied. The device is, therefore, relatively simple to clean. In addition to the structural simplicity of device 2, device 2 is particularly suitable for enabling efficient cooling and simultaneous aeration of a drink. In the case where aeration of the drink to be finally dispensed is not desired, a separate venting unit could then be applied which would have to be connected sequentially in series with mixing chamber 6.

Figure 2:
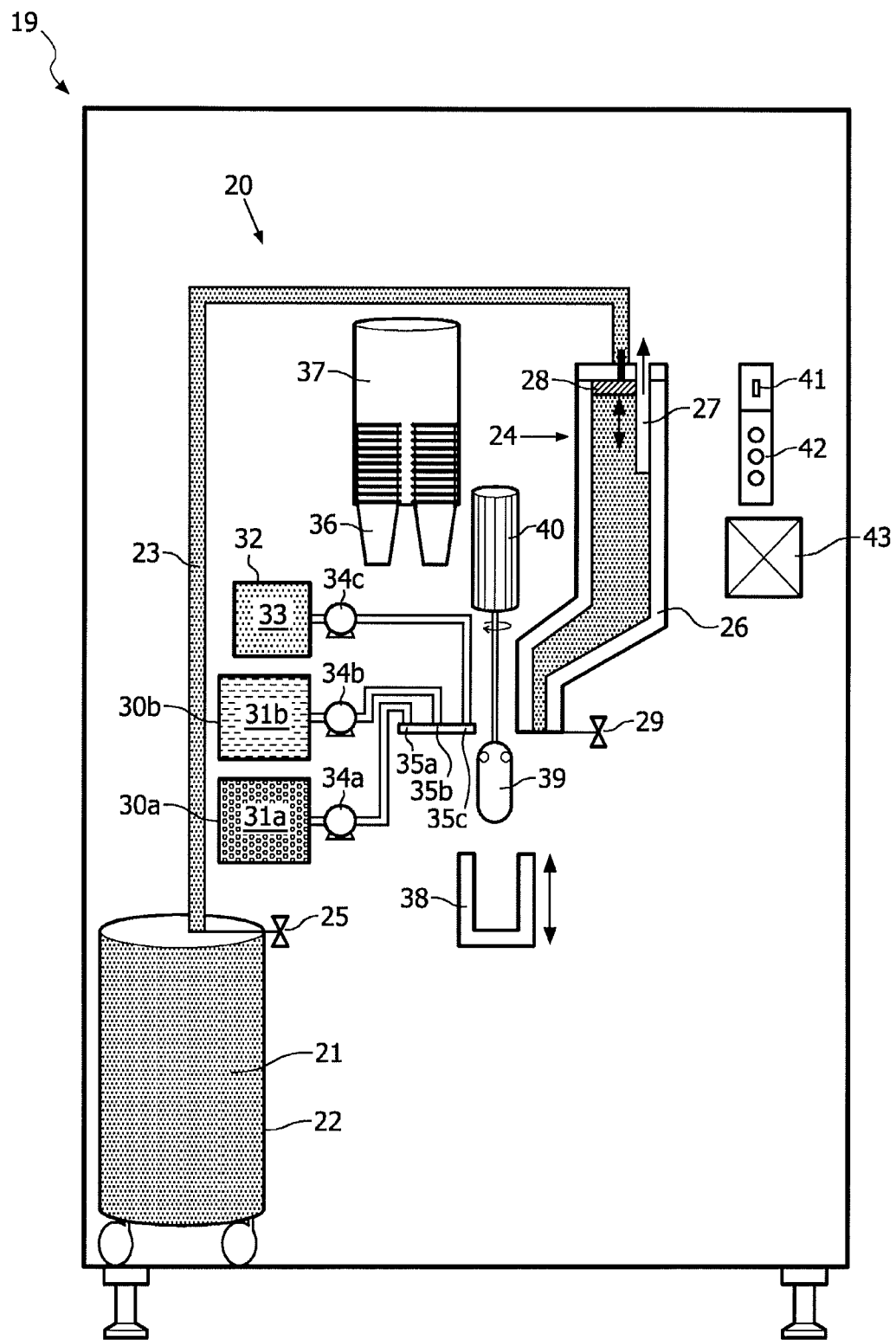
FIG. 2 shows a schematic view of a vending machine provided with another device according to another exemplary embodiment of the present disclosure.

FIG. 2 shows a schematic view of a vending machine 19 provided with another device 20 according to the present disclosure. Device 20 comprises a gas bottle 22 filled with liquid nitrogen 21 and having an internal volume of 40 liters. Via a thermally insulated conduit 23, the gas bottle 22 is connected to a buffer vessel 24 with an internal volume of 3 liters. Conduit 23 can be closed off from gas bottle 22 by means of a tap 25 usually forming part of gas bottle 21. Buffer vessel 24 comprises a double-walled jacket 26 in which a vacuum is created whereby nitrogen 21 can be stored in liquid state in buffer vessel 24. Buffer vessel 24 is provided with an overpressure pipe 27 to enable the escape of evaporated nitrogen in order to be able to prevent excessive pressure build-up in buffer vessel 24. By means of a vertically displaceable needle float 28 received in buffer vessel 24, the buffer vessel 24 can be closed off from gas bottle 22 when a sufficient liquid level has been reached in buffer vessel 24 (as also shown in FIG. 2). An underside of buffer vessel 24 comprises a controllable closing valve 29. When closing valve 29 is opened, liquid nitrogen will begin to flow out of buffer vessel 24. Since the volume of buffer vessel 24 and the nitrogen received therein is known, it is possible to calculate, on the basis of the hydrostatic pressure of the nitrogen, how much nitrogen will flow out of buffer vessel 24 per unit of time when closing valve 29 is opened. As the nitrogen level in buffer vessel 24 drops, needle float 28 will also descend whereby nitrogen 21 will be displaced out of gas bottle 22 and conduit 23 to buffer vessel 24. When a sufficient liquid level has once again been reached, needle float 28 will once again close buffer vessel 24. Device 20 also comprises two drink supply containers 30a, 30b in which different drinks for cooling 31a, 31b are arranged. Device 20 also comprises an additive supply container 32 enabling eventual mixing of drinks 31a, 31b with an additive 33, such as, for instance, a colouring agent or an aroma. Supply containers 30a, 30b, 32 can be guided via a pump 34a, 34b, 34c to a respective nozzle 35a, 35b, 35c using which the drinks and/or the additive can be dispensed. Drinks 31a, 31b, additive 33 and liquid nitrogen 21 can be received in a drinking cup 36 as will be described hereinbelow. From a supply container 37 for drinking cups 36, a drinking cup 36 will be displaced to a thermally insulated drinking cup holder 38. After placing the drinking cup 36 in drinking cup holder 38, the drinking cup holder 38 will be displaced in an upward direction until a stirring element 39 is situated in drinking cup 36. A desired drink 31a, 31b is then dosed and fed via nozzles 35a, 35b to drinking cup 36. Nozzles 35a, 35b, 35c will, in practice, be situated above drinking cup 36 whereby the drink 31a, 31b can fall into drinking cup 36 under the influence of at least the force of gravity. A dosed quantity of additive 33 can optionally also be fed to drinking cup 36. By causing axial rotation of stirring element 39 in drinking cup 36 by means of an electric motor 40, the drink 31a, 31b can be set into a rotating movement whereby the drink 31a, 31b will acquire a concave liquid surface. A dosed quantity of liquid nitrogen 21 will then be arranged in the concave space above the drink 31a, 31b and will be dispersed in drink 31a, 31b as a result of the rotation. Buffer vessel 24 will be oriented such that the liquid nitrogen can also drop into drinking cup 36 under the influence of at least the force of gravity. During this mixing, the nitrogen 21 will evaporate while cooling and aerating the drink. After mixing the drink with the nitrogen, the drinking cup holder 38 will be displaced into a downward position whereafter drinking cup 36 can be removed. In order to obtain a cooled drink 31a, 31b, a person must first pay a sufficient amount via a payment slot 41, whereafter the person can make his/her preferences known via a control panel 42. Device 20 further comprises a control unit 43 for processing the payment and the preferences entered by the person. Control unit 43 will also be adapted to control displacement means (not shown) for displacing a drinking cup 36 from drinking cup supply container 37 to drinking cup holder 38, for displacing drinking cup holder 38, for controlling electric motor 40, for controlling pumps 34a, 34b, 34c and for controlling closing valve 29 of buffer vessel 24 to enable dosaging of liquid nitrogen 21.

Figure 3:
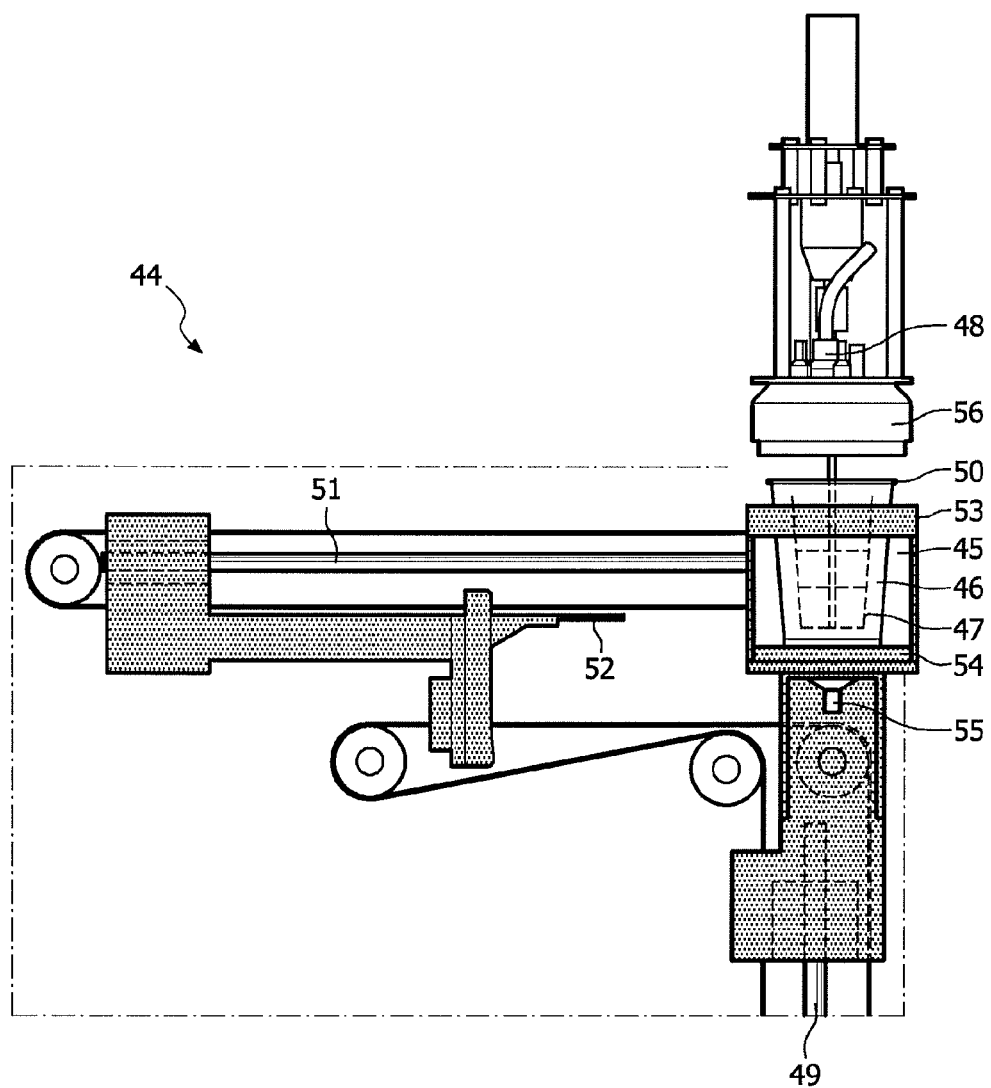
FIG. 3 shows a detailed front view of a part of one exemplary embodiment of a device according to the present disclosure.

FIG. 3 shows a detailed front view of a part one exemplary embodiment of a device 44 according to the present disclosure. Device 44 as shown in FIG. 3 comprises an insulated cup holder 45, this cup holder 45 being adapted to receive at least a part of a disposable drinking cup 46 from a drinking cup supply (not shown). Device 44 also comprises a stirring element 47 which, in the shown situation, is positioned partially in drinking cup 46. Device 44 further comprises dosing means 48 coupled respectively to a drink supply container (not shown) and a supply container (not shown) for liquid nitrogen serving as a cooling medium. Dosing of the quantities of drink and liquid nitrogen respectively to be fed to drinking cup 46 is determined by a control unit (not shown). The dosed quantities of drink and nitrogen will be fed successively to drinking cup 46 wherein, prior to addition of the nitrogen, the stirring element 47 is activated to generate a vortex in the drink already fed to drinking cup 46. Dosing means 48 will then allow the liquid nitrogen to fall into the created vortex in order to enable mixing of the nitrogen and the drink while cooling the drink. Furthermore, the liquid nitrogen will herein evaporate, wherein the drink will also be aerated. In addition to nitrogen bubbles, it is expected that in practice air bubbles will otherwise also be made in the drink through the agency of stirring element 47. The gas bubbles made in the drink will usually be stabilized by the presence of the ice crystals formed in the drink under the influence of the liquid nitrogen. Both the volume and the viscosity of the drink will increase due to the presence of the ice crystals and gas bubbles in the drink. In this exemplary embodiment, the cup holder 45, and thereby drinking cup 46, are vertically displaceable along a first guide 49 relative to stirring element 47 and dosing means 48. After preparation of the cooled drink, the cup holder 45, and thereby drinking cup 46, will be displaced in a downward direction away from stirring element 47 to an intermediate position in which an upper edge 50 of drinking cup 46 is situated just lower than stirring element 47.

Device 44 also comprises a manipulating element 52 horizontally displaceable along a second guide 51. Manipulating element 52 is adapted as a so-called "pick & place" element and is adapted to engage a round drinking cup 46 in the above-stated intermediate position such that upper edge 50 of the drinking cup will generally rest on manipulating element 52. Drinking cup 46 will be held in this position while cup holder 45 will be displaced further in a downward direction to a lowermost position in which an upper edge 53 of cup holder 45 is situated just below a lower edge 54 of drinking cup 46. Manipulating element 52 will then generally displace drinking cup 46 in a linear, horizontal movement to a dispensing opening (not shown) where drinking cup 46, provided with freshly cooled drink, can be taken out of device 44 and can be consumed. As shown, cup holder 45 will be positioned directly below stirring element 47 after removal of drinking cup 46, whereby cup holder 45 is adapted to collect drink residues dripping from stirring element 47. Cup holder 45 is therefore provided with a discharge 55 which will be connected to a discharge conduit (not shown) to enable discharge of collected drink residues. In the case where stirring element 47 were to be flushed clean with a cleaning agent, generally water, after the preparation of a cool drink, the cleaning agent is also collected by and discharged via cup holder 45. Prior to cleaning, the cup holder 45 is displaced in an upward direction until stirring element 47 is accommodated substantially wholly in cup holder 45. Cup holder 45 is herein closed with a closing element 56 connected to stirring element 47 in order to be able to limit splashing of drink residues and cleaning agent outside cup holder 45, and thereby limit fouling of device 44. During the cleaning of stirring element 45, it is generally advantageous to rotate stirring element 47 whereby drink residues and cleaning agent will be removed relatively easily from the stirring element. It is noted that the cleaning process described hereinabove can also be applied separately, and is thus not necessarily dependent on and has to follow the method according to the present disclosure. It is moreover possible to envisage that this cleaning process could also be applied in devices other than in a device according to the present disclosure whereby the cleaning process described hereinabove can be deemed as an invention.

Figure 4A:
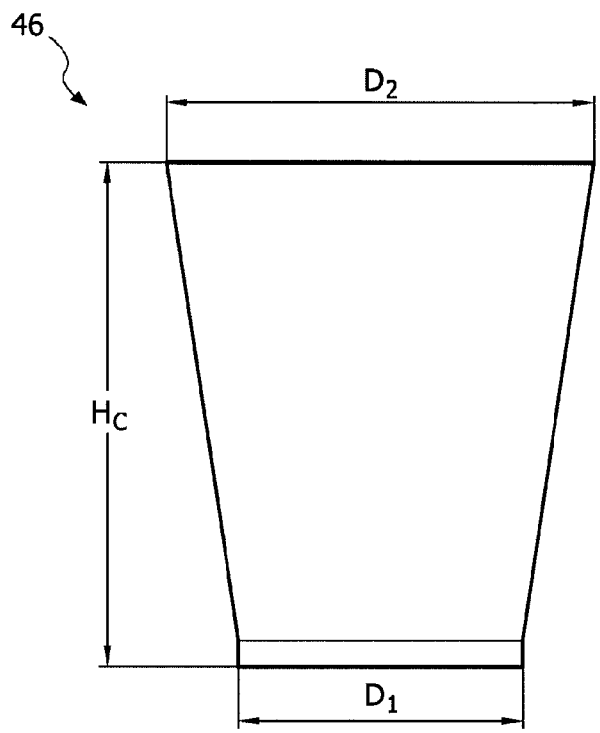
FIG. 4a is a schematic side view of a drinking cup for use in the device shown in FIG. 3.

FIG. 4a shows a schematic side view of drinking cup 46 for use in device 44 shown in FIG. 3. Drinking cup 46 is manufactured in this exemplary embodiment from plasticized cardboard and has the form of a truncated cone. In this exemplary embodiment the lower diameter $D_1$ is 60 mm, the upper diameter $D_2$ is 90 mm and the internal height $H_c$ is 100 mm. The volume of the cup is about 450 ml.

Figure 4B:
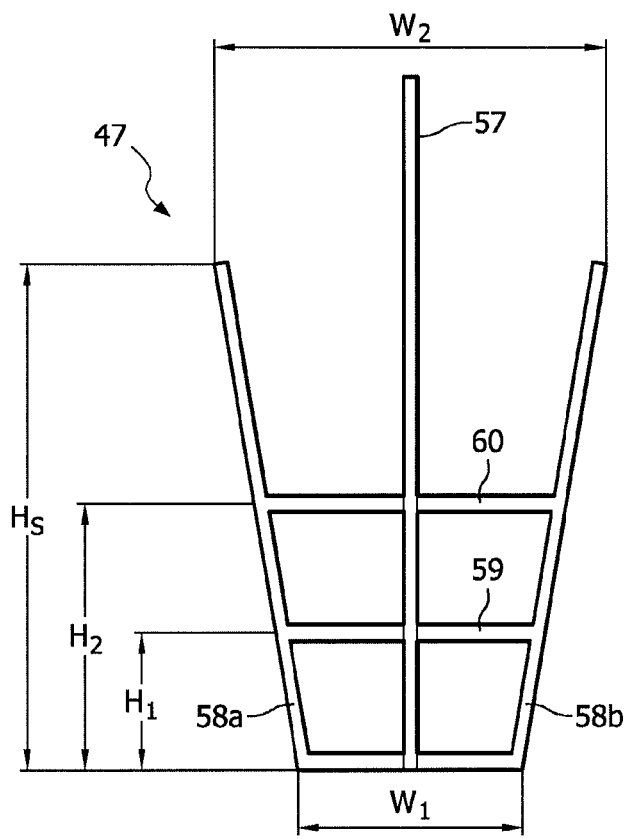
FIG. 4b is a schematic side view of a stirring element for use in the device shown in FIG. 3.

FIG. 4b shows a schematic side view of stirring element 47 for use in device 44 shown in FIG. 3. The design and dimensioning of stirring element 47 is, particularly in relation to the design and dimensioning of drinking cup 46, generally particularly critical in being able to form a satisfactory vortex in the drink in order to be able to arrive at a controlled feed of the cooling medium to the drink. By means of stirring element 47 shown in FIG. 4b, a substantially elliptic paraboloid vortex can be formed in drinking cup 46 shown in FIG. 4a. Stirring element 47 is a so-called frame-type stirrer comprising a central rotation shaft 57 to which two anchor parts 58a, 58b are connected. Anchor parts 58a, 58b are mutually connected by means of two transverse connections 59, 60. The width $W_1$ of a bottom side of the stirring element is 50 mm, the width $W_2$ of a top side of stirring element 47 is 68 mm, and the height $H_s$ of stirring element 47 is 88 mm. The distances $H_1$, $H_2$ from the underside of stirring element 47 to transverse connections 59, 60 are respectively 22 mm and 38 mm.

Figure 5A:
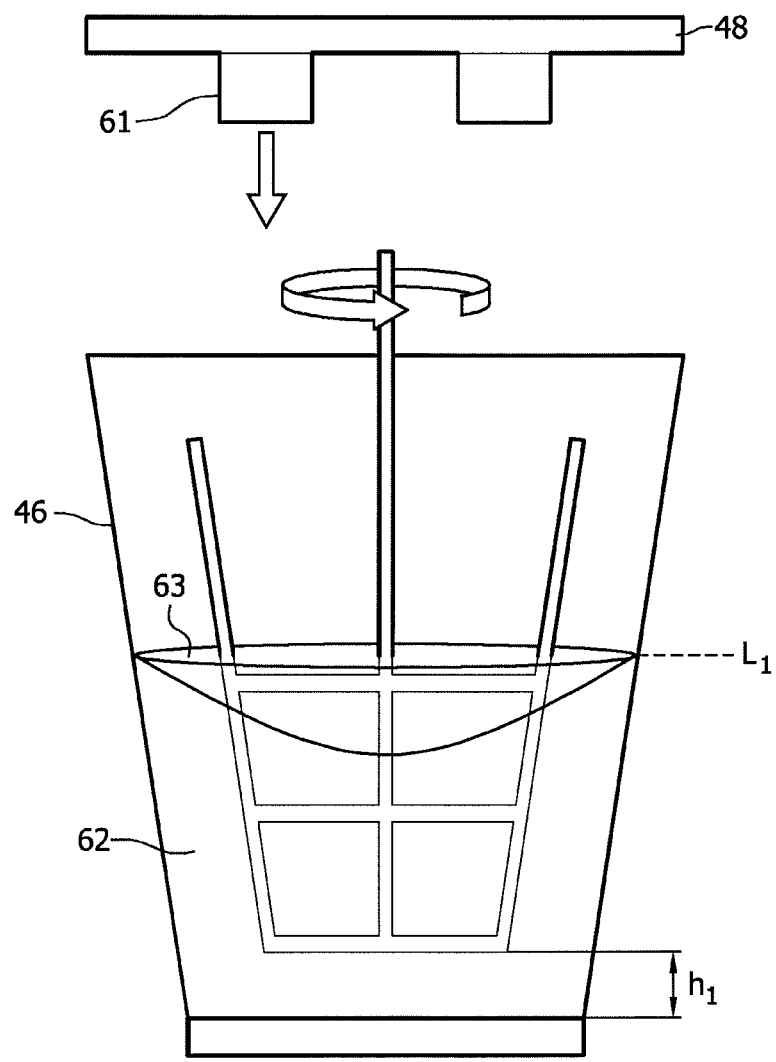
FIG. 5a shows a first step in the preparation of a cooled drink according to the present disclosure.
Figure 5B:
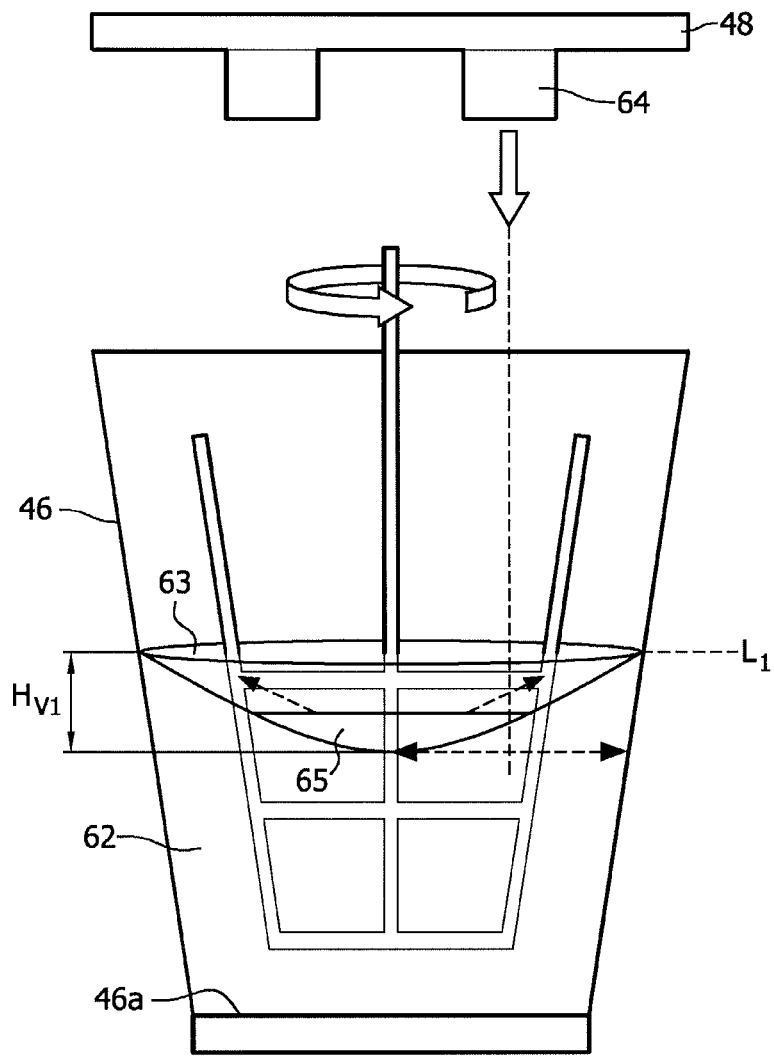
FIG. 5b shows a second step in the preparation of a cooled drink according to the present disclosure.
Figure 5C:
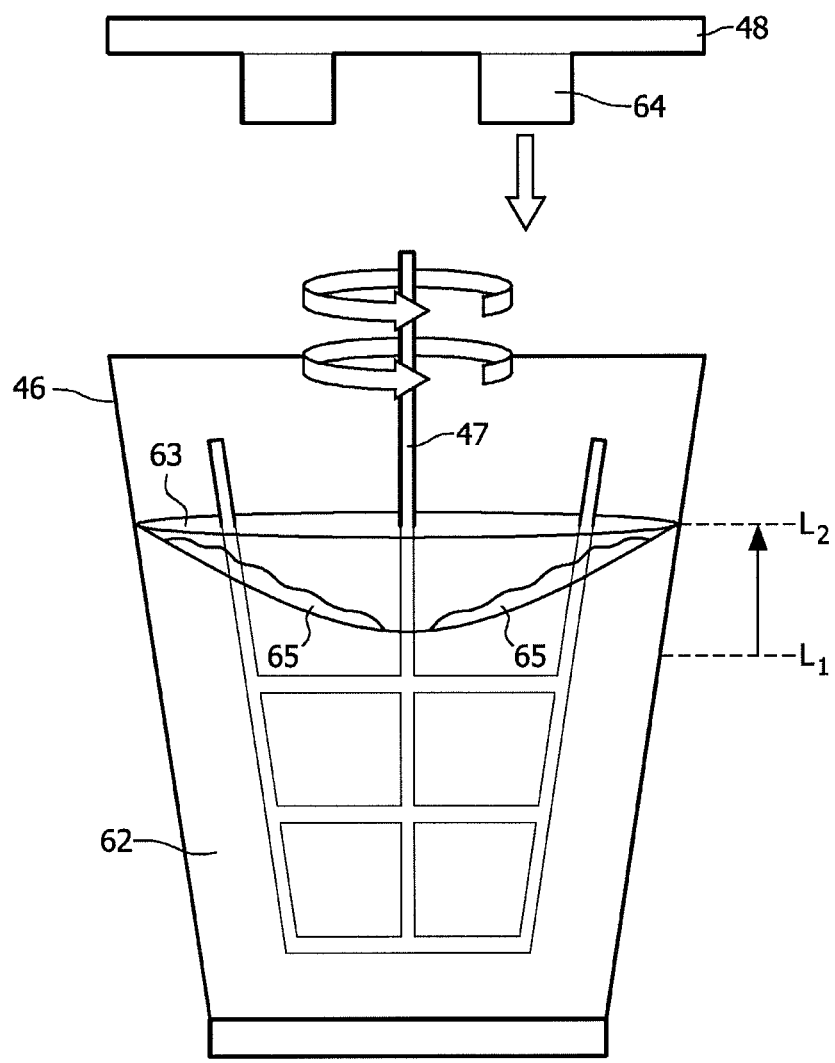
FIG. 5c shows a third step in the preparation of a cooled drink according to the present disclosure.
Figure 5D:
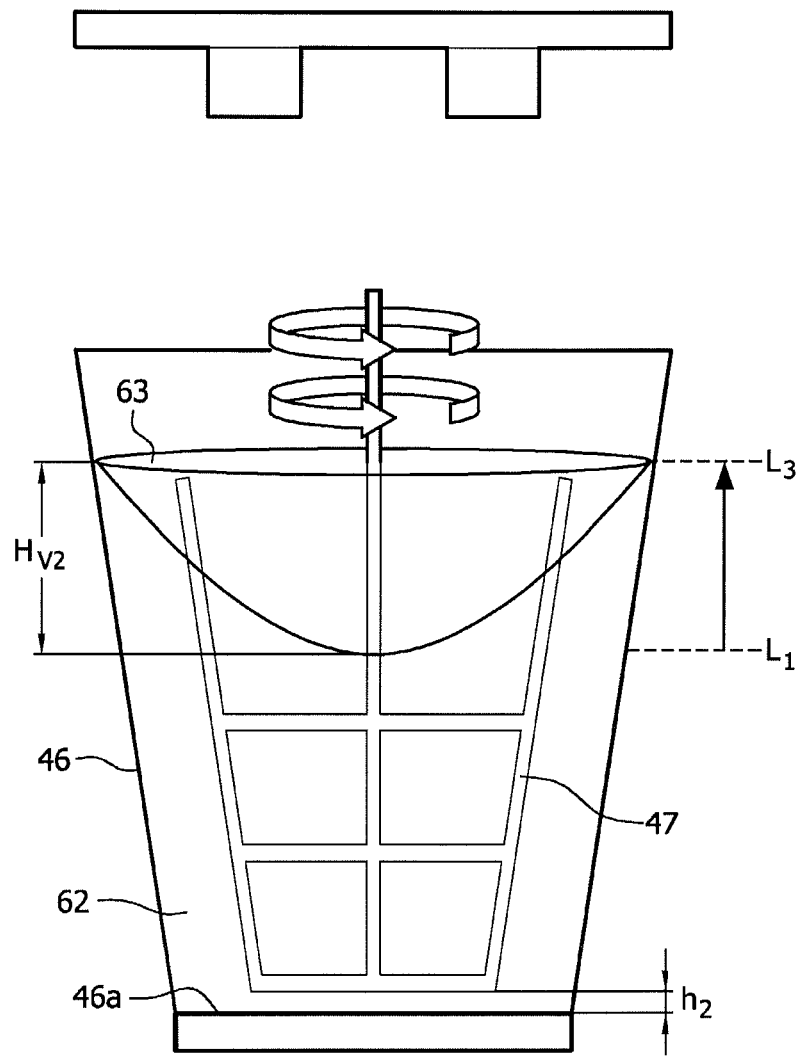
FIG. 5d shows a fourth step in the preparation of a cooled drink according to the present disclosure.

FIGS. 5a-5d show successive steps in the preparation of a cooled drink, in particular, a milkshake, according to the present disclosure. Particular use is made here of device 44 shown in FIG. 3. FIGS. 5a-5d show particularly the assembly of dosing means 48, stirring element 47 and drinking cup 46. The method for preparing a cooled milkshake can be described with reference to FIGS. 5a-5d. In a first step (see FIG. 5a) about 176 ml of milkshake 62 is fed via a first nozzle 61 of dosing means 48 to drinking cup 46. Milkshake 62 herein comprises an aqueous substance which will generally be enriched with, for instance, skimmed milk, water-buffalo milk, powdered milk, fructose, whey powder and one or more additives such as a coloring agent, aromatic substance and/or flavoring. By means of stirring element 47, a vortex 63 substantially having the form of an elliptic paraboloid is created in milkshake 62. Stirring element 47 has a rotation speed of 1150 revolutions per minute. The highest liquid level is indicated by means of the broken line $L_1$. In this exemplary embodiment, stirring element 47 is located about 15 mm ($h_1$) from a bottom element 46a of drinking cup 46. After feeding the milkshake 62, liquid nitrogen 65 will be fed to drinking cup 46 via a second nozzle 64 forming part of dosing means 48 such that the nitrogen 65 will fall into vortex 63 (see FIG. 5b). The height of the vortex $H_{v1}$ is about 3 cm. The overall volume of nitrogen 65 fed to vortex 63 is about 45% of the volume enclosed by vortex 63. Owing to the rotating movement of vortex 63, centrifugal forces will be exerted on the nitrogen present in vortex 63 whereby the nitrogen 65 inside vortex 63 will creep in an eccentric direction. The quantity of supplied nitrogen 65 and the shape of vortex 63 are, however, adjusted to each other here such that the liquid nitrogen 65 will not come into contact with drinking cup 46, or hardly so. As shown, the nitrogen 65 is fed at about 50% of the shortest distance between stirring element 47 and drinking cup 46 as calculated from the lowest point of vortex 63 and from stirring element 47. Contact between liquid nitrogen 65 and both stirring element 47 and drinking cup 46 can in this way be prevented as far as possible. FIG. 5c shows that the liquid nitrogen 65 still present in the vortex moves in eccentric direction wherein the nitrogen 65 is continuously absorbed into milkshake 62 during the stirring while cooling and aerating milkshake 62. As a result, the volume of milkshake 62 increases to a liquid level $L_2$ higher than the initial liquid level $L_1$, whereby the viscosity of milkshake 62 increases considerably. Because the chance of splashing is hereby reduced, a higher stirring speed is then applied in order to be able to effect an intensive mixing between milkshake 62 and nitrogen 65. In order to further intensify this mixing, the stirring element 47 is displaced in a downward direction relative to drinking cup 46 (or vice versa) to a lower position (see FIG. 5d) in which the distance $h_2$ between the lowest part of stirring element 47 and the bottom element 46a of drinking cup 46 is reduced from 15 mm ($h_i$) to about 2-4 mm. The result is a deeper vortex 62 with a height $H_{v2}$ of about 5 cm, whereby the liquid level further increases to level $L_3$. After sufficient mixing of milkshake 62 with liquid nitrogen 65, the stirring element 47 will be removed from drinking cup 46, after which the cooled and aerated milkshake 62 can be consumed.

It will be apparent that the invention is not limited to the exemplary embodiments shown and described hereinabove but that many embodiments, which will be self-evident to a skilled person, are possible within the scope of the present disclosure.

All patents, patent applications and publications referred to herein are incorporated by reference in their entirety.

The invention claimed is:

1. A device for cooling drinks, comprising:
   a) at least one drink supply container for a water-comprising drink: and
   b) at least one cooling medium supply container for holding at least one cooling medium;
   c) dosing device coupled to the drink supply container and the cooling medium supply container and adapted to dose a quantity of drink and a quantity of cooling medium required for cooling the dosed quantity of drink,
   d) at least one mixing chamber for successively collecting a quantity of drink and a quantity of cooling medium respectively dosed by the dosing device, and
   e) at least one stirring element positioned relative to the mixing chamber such that the stirring element generates a vortex in the drink present in the mixing chamber for the purpose of receiving a quantity of cooling medium fed to the mixing chamber, wherein the stirring element is also adapted to mix together drink present in the mixing chamber and cooling medium present in the mixing chamber, wherein the cooling medium in the mixing chamber undergoes at least one of a phase change to the gaseous state or an adiabatic expansion while cooling the drink.

2. The device of claim 1, wherein the stirring element is positioned relative to the mixing chamber such that the stirring element generates a substantially elliptic paraboloid vortex in the drink present in the mixing chamber.

3. The device of claim 1, wherein the mixing chamber is removably associated with the device.

4. The device of claim 1, wherein the relative orientation of the stirring element and the mixing chamber can be changed.

5. The device of claim 1, wherein the stirring element and the mixing chamber are displaceable in an axial direction relative to each other.

6. The device of claim 1, further comprising at least one holder for holding the mixing chamber in position.

7. The device of claim 6, wherein the least one holder is adapted to displace the mixing chamber in the device.

8. The device of claim 1, further comprising a mixing chamber holder for receiving at least a part of the mixing chamber.

9. The device of claim 1, wherein the mixing chamber holder substantially wholly encloses the mixing chamber.

10. The device of claim 1, wherein the stirring element has a substantially mirror-symmetrical form.

11. The device of claim 1, wherein the dosing device allow the cooling medium to fall into the mixing chamber.

12. The device of claim 1, wherein the dosing device the cooling medium to the mixing chamber at a position lying between a longitudinal axis of the mixing chamber and a wall of the mixing chamber.

13. The device of claim 12, wherein the dosing device feed the cooling medium to the mixing chamber at a position located between 10% and 80% of the shortest distance between the longitudinal axis of the mixing chamber and the wall of the mixing chamber as calculated from the longitudinal axis of the mixing chamber.

14. The device of claim 1, wherein the dosing device comprises at least one nozzle connected to the drink supply container and at least one nozzle connected to the cooling medium supply container.

15. The device of claim 1, further comprising a control unit adapted to control the dosing device such that a dosed quantity of drink and a dosed quantity of cooling medium can be fed successively to the mixing chamber.

16. The device of claim 1, wherein the cooling medium supply container is adapted to hold a cryogenic cooling medium, the boiling point of which is lower than the freezing point of the drink.

17. The device of claim 1, wherein the cooling medium supply container further comprises pressure-generating means to enable displacement of cooling medium under pressure from the cooling medium supply container to the dosing means.

18. The device of claim 1, wherein the dosing device allows a supply of the cooling medium such that the final temperature of the drink cooled in the mixing chamber is either less than or equal to the freezing point of the drink.

19. The device of claim 1, wherein the drink supply container comprises a pressure-generating means to enable displacement of drink under pressure from the drink supply container to the dosing device.

20. The device of claim 1, further comprising a substantially closed housing comprising at least the drink supply container and the cooling medium supply container.

21. The device of claim 1, further comprising at least one additive supply container for an additive, the additive supply container connects to the mixing chamber.

22. A vending machine, comprising:
   a) apparatus for providing drinks responsive to a user input signal
   b) at least one device for cooling drinks, comprising:
      i) at least one drink supply container for a water-comprising drink; and
      ii) at least one cooling medium supply container for holding at least one cooling medium;
      iii) dosing device coupled to the drink supply container and the cooling medium supply container and adapted to dose a quantity of drink and a quantity of cooling medium required for cooling the dosed quantity of drink,
      iv) at least one mixing chamber for successively collecting a quantity of drink and a quantity of cooling medium respectively dosed by the dosing device, and
      v) at least one stirring element positioned relative to the mixing chamber such that the stirring element generates a vortex in the drink present in the mixing chamber for the purpose of receiving a quantity of cooling medium fed to the mixing chamber, wherein the stirring element is also adapted to mix together drink present in the mixing chamber and cooling medium present in the mixing chamber, wherein the cooling medium in the mixing chamber undergoes at least one of a phase change to the gaseous state or an adiabatic expansion while cooling the drink.

23. A method for cooling drinks, comprising:
   a) feeding a dosed quantity of drink for cooling to a mixing chamber;
   b) feeding the drink into the mixing chamber such that a vortex is formed in the drink;
   c) feeding a dosed quantity of cooling medium into the mixing chamber such that the cooling medium is enclosed by the vortex; and
   d) mixing the drink with at least a part of the fed quantity of cooling medium, wherein the cooling medium either undergoes a phase change to the gaseous state or undergoes an adiabatic expansion while cooling the drink.

24. The method of claim 23, wherein a substantially elliptic paraboloid vortex is generated during step b.

25. The method of claim 23, wherein a vortex is generated during step b with a depth of between 1 and 6 cm.

26. The method of claim 23, wherein the cooling medium is fed to the mixing chamber in step c at a position located between 10% and 80%, of the shortest distance between the longitudinal axis of the mixing chamber and the wall of the mixing chamber as calculated from the longitudinal axis of the mixing chamber.

27. The method of claim 23, wherein the quantity of cooling medium fed to the mixing chamber during step c amounts to between 10% by volume and 70% by volume of the volume enclosed by the vortex.

28. The method of claim 23, wherein at least one stirring element keeps the drink in motion according to step b and to mix the drink and the cooling medium according to step d.

29. The method in claim 28, wherein the stirring speed of the stirring element is higher during step d than during step b.

30. The method of claim 28, wherein the position of the stirring element relative to the mixing chamber can be changed between a lower position and at least one position higher than the lower position, wherein the stirring element is positioned at a higher position during step b, and wherein the stirring element is displaced to the lower position during step d.

31. The method of claim 30, wherein the stirring element is removed from the mixing chamber after performing step d.

32. The method of claim 23, further comprising:
  e) displacing the mixing chamber to a dispensing opening for the mixing chamber after performing step d.

33. The method of claim 23, wherein the mixing chamber is formed by a drinking cup.

34. The method of claim 23, wherein step a and step c are repeated at least once after performing of step c.

35. The method of claim 23, wherein the quantity of cooling medium feeds in a plurality of sub-doses into the mixing chamber during step c.

36. The method of claim 23, wherein a quantity of cooling medium is supplied to the mixing chamber during step c such that the final temperature of the cooled drink is either lower than or equal to the freezing point of the drink.

37. The method of claim 23, wherein the cooling medium supplied during step c is mixed substantially homogeneously during step d with the drink displacing in the mixing chamber.

38. The method of claim 23, wherein the drink in the mixing chamber is set into motion during step b such that contact of the cooling medium fed during step c with a wall of the mixing chamber is substantially prevented.

* * * * *